July 22, 1924.

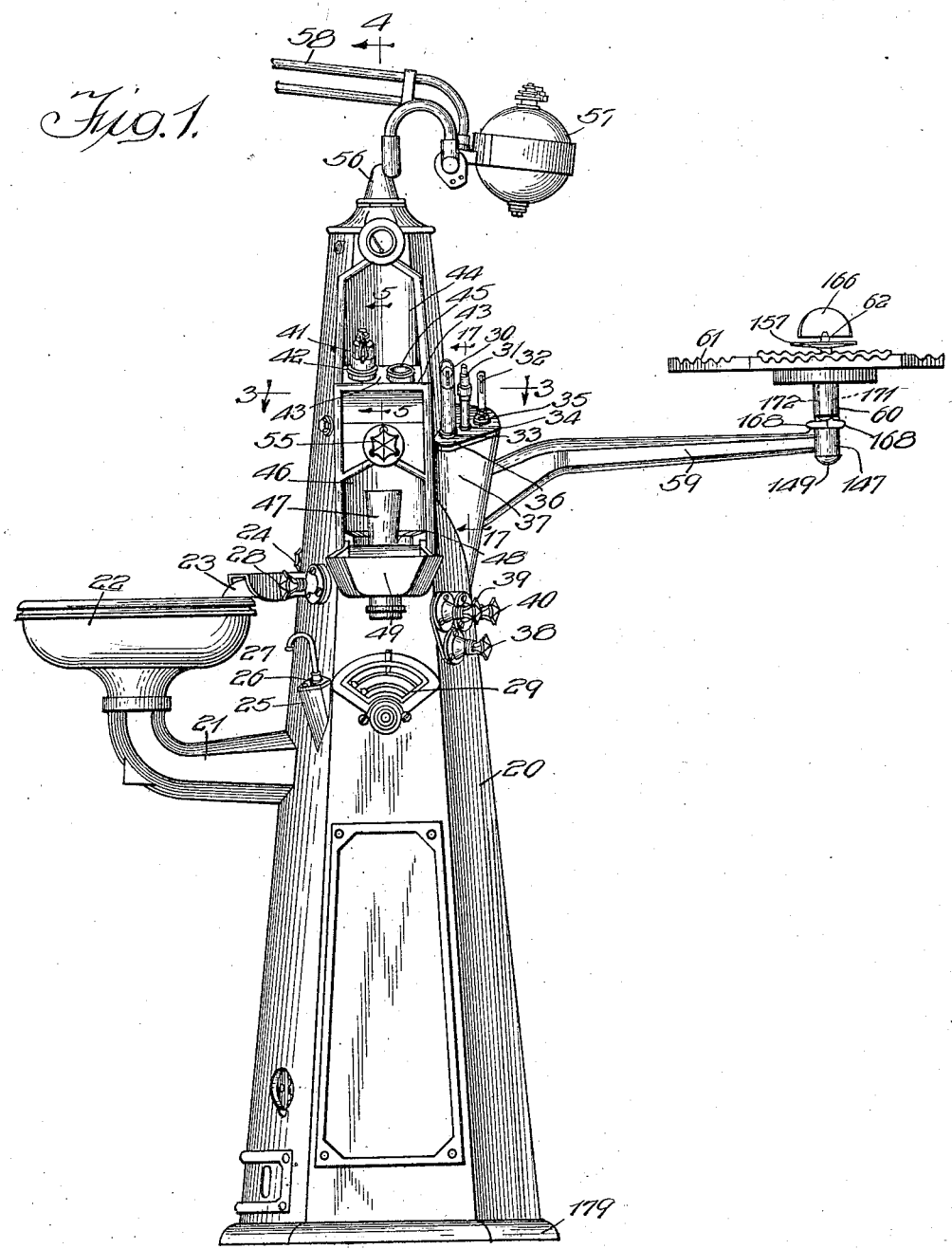

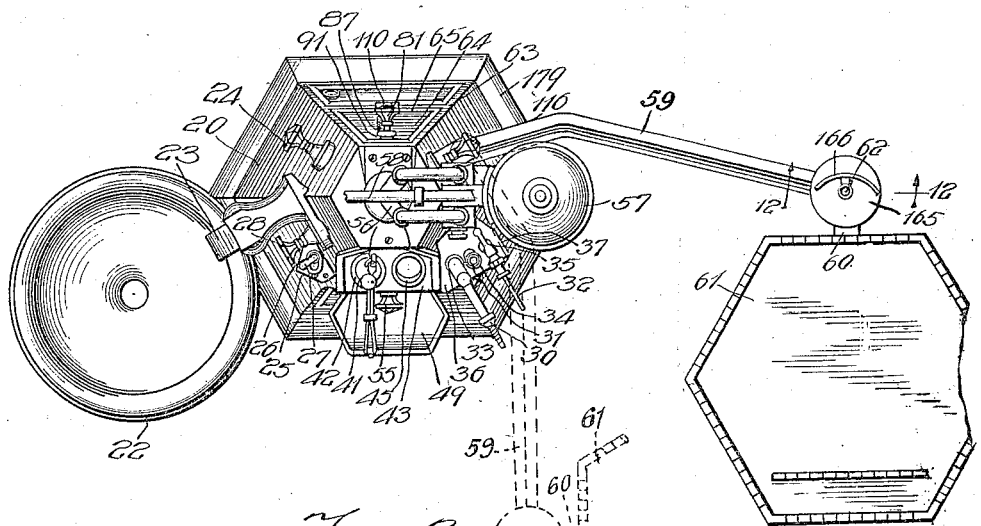
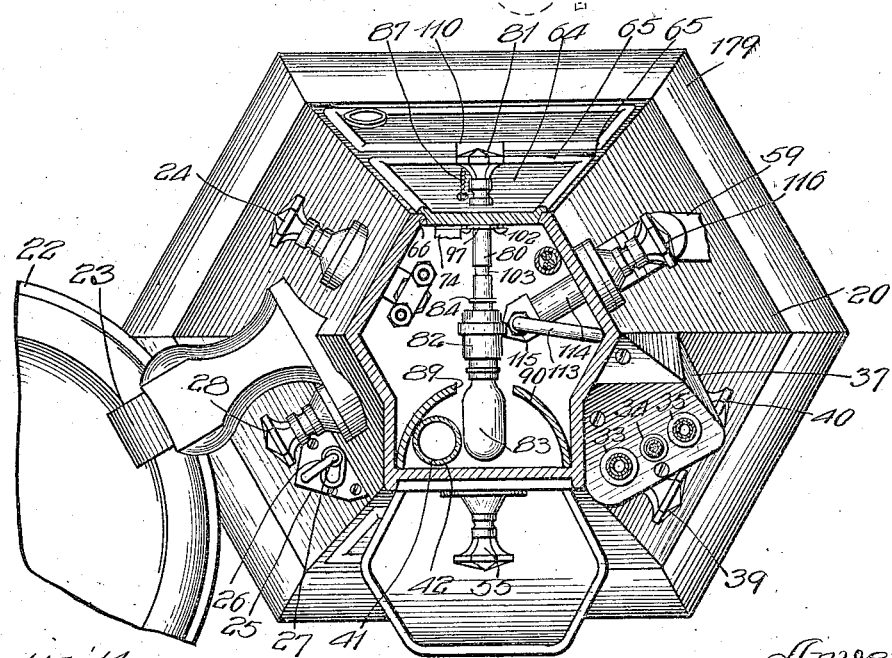

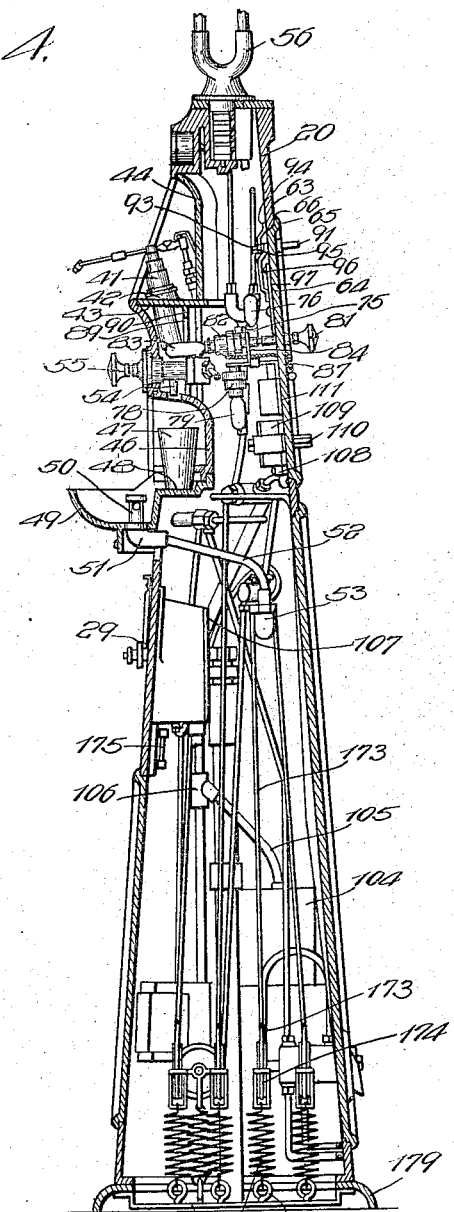

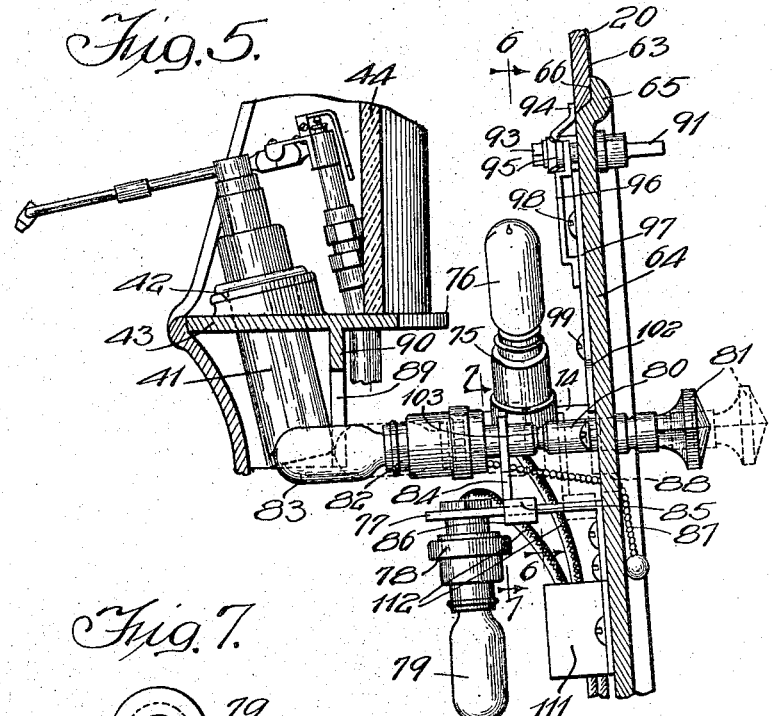
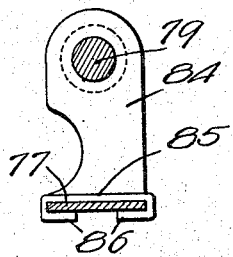
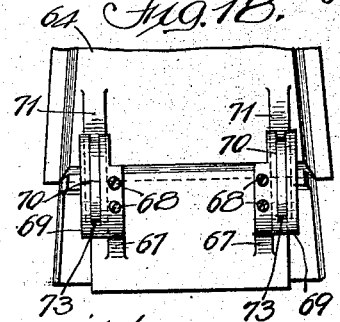
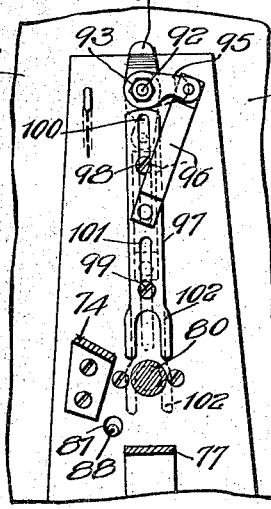

J.V. HANBERG

DENTAL APPLIANCE

Filed July 16, 1921      6 Sheets-Sheet 5

1,502,247

Witnesses:
W. F. Kilroy
Harry L. White

Inventor:
John V. Hanberg,
By John Howard McElroy
his Atty.

July 22, 1924.

J.V. HANBERG

DENTAL APPLIANCE

Filed July 16, 1921 6 Sheets-Sheet 6

1,502,247

Witnesses:
W.J. Kilroy
Harry R. White

Inventor:
John V. Hanberg,
By John Howard McElroy
Atty.

Patented July 22, 1924.

1,502,247

UNITED STATES PATENT OFFICE.

JOHN V. HANBERG, OF CHICAGO, ILLINOIS, ASSIGNOR TO A. C. CLARK & COMPANY, OF CHICAGO, ILLINOIS, A CORPORATION OF ILLINOIS.

DENTAL APPLIANCE.

Application filed July 16, 1921. Serial No. 485,390.

*To all whom it may concern:*

Be it known that I, JOHN V. HANBERG, a citizen of the United States, and a resident of Chicago, in the county of Cook and State of Illinois, have invented certain new and useful Improvements in Dental Appliances, of which the following is a full, clear, and exact specification.

My invention is concerned with dental appliances, and more especially with certain appliances adapted to form a part of a complete dental unit, wherein all the appliances needed by a dentist in working directly on a patient are brought together upon a common pedestal whence they can be moved to whatever position may be necessary for use.

One feature of my invention resides in a novel means whereby I am enabled to keep the contents of a hot water spray bottle or glass warmed to any desired temperature.

Another feature resides in the novel combination of certain translucent canopies in the pedestal with means in the pedestal back of them to produce an artistic effect and appearance.

Another feature of my invention resides in a movable panel for the pedestal carrying an incandescent lamp movable into a plurality of positions and provided with a locking mechanism therefor so arranged that the light has to be moved to a certain position before the panel can be unlocked to open it.

Another feature of my invention resides in a novel bracket arm having a Bunsen burner at its outer end, and also provided with an extension arm pivoted thereto carrying a work table.

Another feature of my invention resides in the novel gas pipe connections associated with said bracket arm whereby the latter can be swung horizontally to any desired position without affecting the flow of the gas to the burner.

Another feature of my invention resides in the employment of novel sockets for appliances connected by tubes or cables with the interior of the pedestal so set that they are withdrawn and replaced easily and effectively and without substantial wear on the connecting tubes or cables.

Another feature of my invention is a novel hinge connection for said removable panel.

To illustrate my invention, I annex hereto six sheets of drawings in which the same reference characters are used to designate identical parts in all the figures of which—

Fig. 1 is a front elevation of a complete unit embodying my inventions, part of the work table and of the drill bracket being broken away;

Fig. 2 is a top plan view of the structure shown in Fig. 1;

Fig. 3 is a top plan view, but on a larger scale, as seen in section on the line 3—3 of Fig. 1;

Fig. 4 is a central vertical section on the line 4—4 of Fig. 1;

Fig. 5 is an enlarged detail in section on the line 5—5 of Fig. 1;

Figure 8:
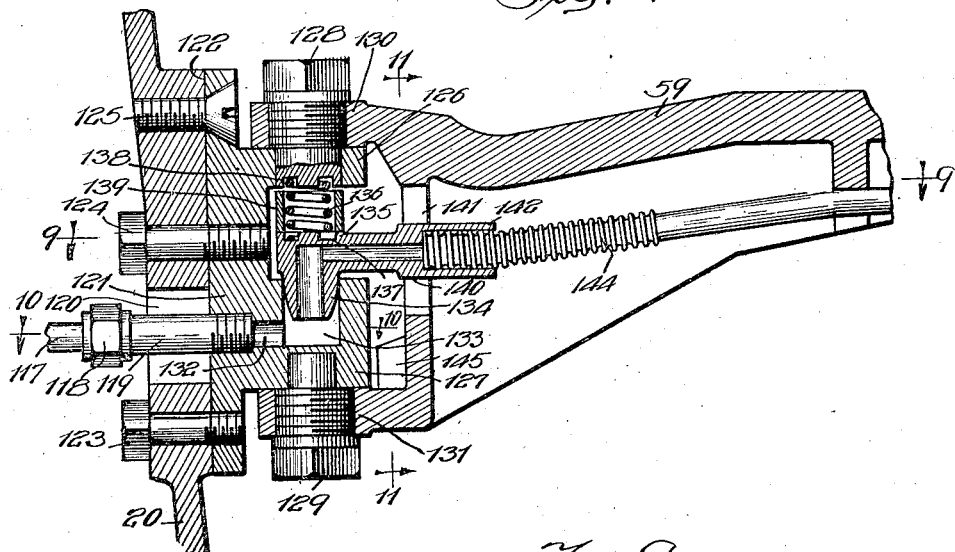
Figure 9:
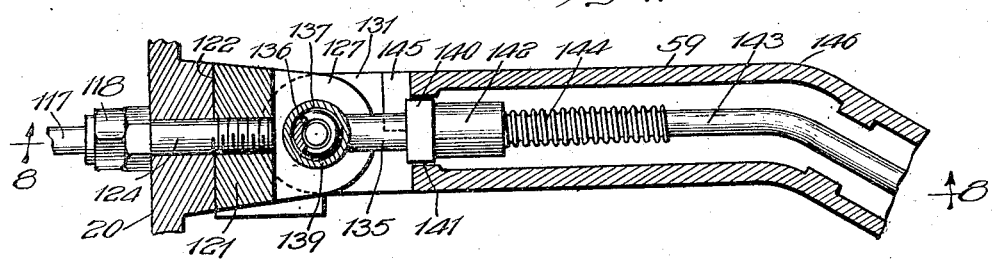
Figure 10:
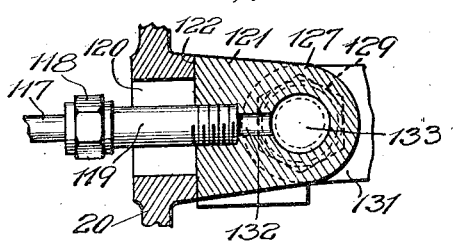
Figure 11:
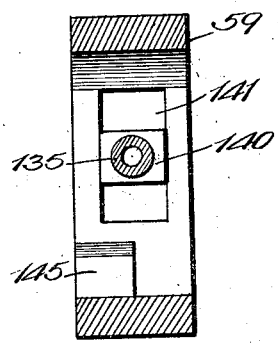
Figure 12:
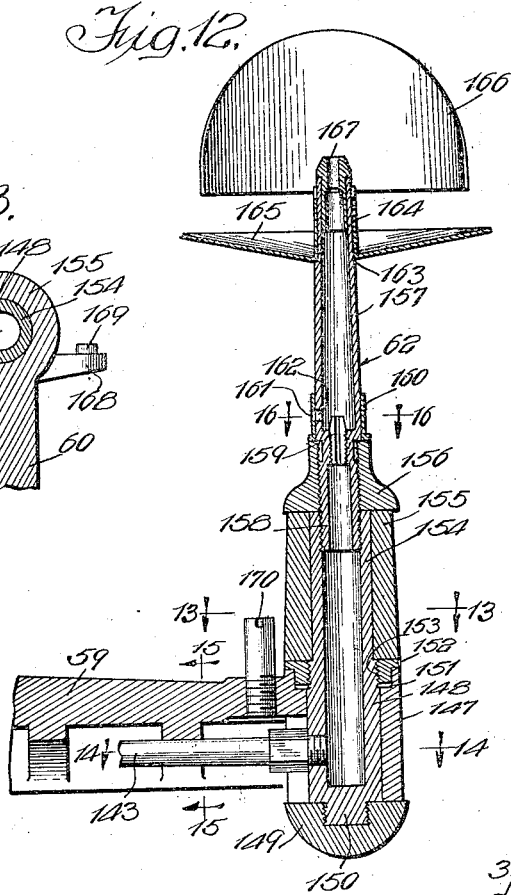
Figure 13:
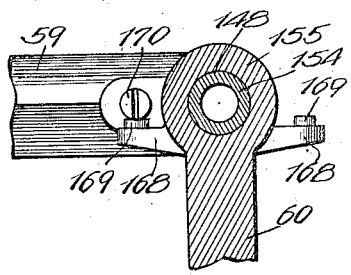
Figure 14:
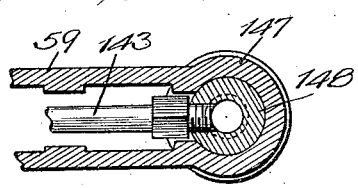
Figure 17:
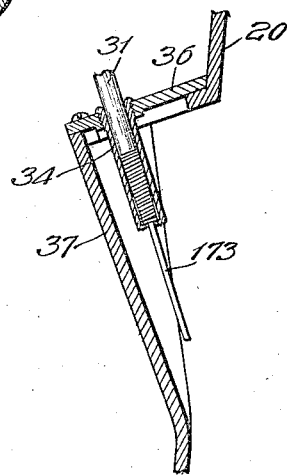
Figure 15:
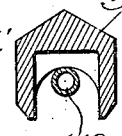
Figure 16:

Figs. 6 and 7 are details in section on the lines 6—6 and 7—7, respectively, of Fig. 5;

Fig. 8 is a vertical section as seen on the line 8—8 of Fig. 9 of the gas arm bearing bracket;

Figs. 9, 10 and 11 are details in section on the lines 9—9, 10—10 and 11—11, respectively, of Fig. 8;

Fig. 12 is a detail in section, on an enlarged scale on the line 12—12 of Fig. 2;

Figs. 13, 14, 15 and 16 are details in section on the lines 13—13, 14—14, 15—15 and 16—16, respectively, of Fig. 12;

Fig. 17 is an enlarged detail in section on the line 17—17 of Fig. 1;

Fig. 18, sheet 4, is a view of the lower portion of the removable door panel shown in Fig. 5, as seen from the interior, showing the hinge construction; and Fig. 19 is a side elevation of the same.

In carrying out my invention in its preferred form, I have employed a hollow six-sided tapering pedestal 20 having projecting from one side thereof the hollow arm 21 supporting the customary spittoon bowl supplied with water through the connection 23, with a water pipe in the pedestal controlled by the valve 24.

Projecting from one side below the plane of the bowl 22 is an offset 25 supporting the socket 26 for the saliva ejector controlled by the valve 28. Adjacent this offset is the rheostat 29 for controlling the current to the hot air syringe 30 and the mouth lamp 31, these, together with the cold water syringe 32, being supported in the sockets 33, 34 and 35 set at an angle on the plate 36 secured on the top of the offset 37. Below the offset 37 are the valves 38, 39 and 40, the valve 38 reducing the air pressure from a high pressure supply pipe, while the valves 39 and 40, respectively, control the pressure actually delivered to the hot water spray bottle 41 and the hot air syringe 30, respectively. The hot water spray bottle 41 is seated in the socket 42 mounted in the horizontal bottom 43 of a recess in the front and top of the pedestal, while its back, sides and top are formed by the opalescent glass canopy 44. A companion socket 45 may be used to support a second hot water spray bottle or a slender drinking glass for warm water may be seated in it, as preferred. Below the canopy 44 is a similar one 46, forming the sides, back and top of a recess intended to receive a cold water drinking glass 47 seated on the horizontal bottom 48 of the recess (see Fig. 4), said bottom being formed by the raised rear portion of the finger bowl 49, having the overflow pipe 50 projecting upward from the center thereof and connected by an elbow 51 with a pipe 52 opening into the waste pipe adjacent the device 53 controlling the operation of the saliva ejector. The water for the glass 47 is furnished by the nipple 54 connected to a cold water supply pipe and is controlled by the valve 55.

At the top of the pedestal 20 may be mounted the rotatable forked bracket 56 in which is rotatably mounted the dental engine 57 which carries a well known bracket 58 for the drill or burrs operated by the engine 57. Back of the offset 37 is pivoted, as hereinafter described, the arm 59 having pivoted at its outer end the arm 60, supporting at its outer end the table 61. At the joint of the arms 59 and 60 is located the Bunsen burner 62.

Having now described the general layout of the unit, I may describe the features with which my invention is more particularly concerned, as follows:

In the top of the rear panel 63 is a door 64 provided on all four sides with the flange 65 adapted to fit over the edge of the correspondingly shaped apertures 66 in which the door or panel 64 is seated. As an ordinary hinge would be unsightly, I employ the novel construction shown in Figs. 18 and 19, where the interior of the panel just below the opening 66 is shown as provided with the pair of ears 67 on each of which is secured by the screws 68 the curved metal sheet or boss 69 having the vertical slot 70 therein. The door or panel 64 has the pair of hinge pieces 71 projecting inwardly and downwardly from the bottom thereof, said pieces being shaped to form the hooks 72 on their inner sides, which hooks hold the panel when it is opened and hanging down, as shown in dotted lines in Fig. 19. The pieces 71 have the meniscus-shaped extensions 73 which are just thick enough to fit in the recesses 70 and prevent sidewise movement of the door or panel.

Secured to one side of the back of the panel 64 a little above the center is the angular bracket 74, which has secured thereon on the upper side of its inner end the socket 75 for a small incandescent lamp 76, which I employ to furnish illumination back of the opalescent glass canopy 45, and thus produce a beautifying effect thereby. Centrally located below the center of the panel 64 is a larger angular bracket 77, which has secured on the under side of its horizontal portion at the inner end thereof the socket 78 for the incandescent lamp 79, whose function is to illuminate the back of the opalescent glass canopy 46. Mounted to slide through a circular aperture in the panel 64 above the bracket 77 is a rod 80 having the external handle 81 and carrying at its inner end the socket 82 for the preferably elongated incandescent lamp 83 which has the function of heating the water in the spray bottle or bottles 41, it being capable of being moved, as seen in Figs. 3, 4 and 5, between a pair of such bottles or glasses held in the sockets 42 and 45, and when in this position, it will heat the contents of the bottles.

If they are to be heated to a lesser degree, the rod is drawn out, as seen in dotted lines in Fig. 5, to a point where less of the radiated heat from the lamp will strike the bottles. To maintain the rod horizontal, and prevent its cramping in its aperture in the panel, I secure to it adjacent the socket 82 the bracket 84 having the horizontal portion 85 with its downwardly and inwardly turned edges 86 embracing the horizontal portion of the bracket 77 so as to guide the lamp and rod in their movement. The lamp socket 83 is provided with a customary switch opened and closed in a well known manner by successive pulls on the chain 87 connected thereto and extending through the aperture 88 in the panel 64, so that the lamp 83 may be turned on or off in either adjustment.

When the lamp 83 is in its innermost position, as seen in Fig. 3, it extends through the inverted U-shaped opening 89 formed in the back of the flange 90, semi-circular in horizontal cross-section, which is formed integral with and extends downward from the under side of the plate 43, previously mentioned as forming the bottom of the recess for the hot water spray bottle 41. If the door or panel 64 were swung open with the lamp 83 in its innermost position seen in Figs. 3 and 5, the lamp would strike the top of the opening 89 and possibly be fractured, so that it becomes necessary to lock the door against being opened when the lamp 83 is in said innermost position. To this end then, I employ the interlocking mechanism shown in Figs. 3, 5 and 6, where it will be seen that the locking button 91 is secured on the short shaft 92 journaled in a bearing aperture in the boss formed near the top of the door 64, which shaft 92 has secured on its inner end by the nut 93, or otherwise, a short bell crank lever, the upper arm 94 of which, when the button 91 is turned to locking position, is vertical and engages the casing, as seen in Fig. 5, to lock the door closed. The other arm 95, at right angles thereto, has pivoted to its outer end the upper end of the link 96, the lower end of which is pivoted to the locking bar 97 guided in its vertical movement by the screws 98 and 99 passed respectively through the elongated slots 100 and 101 in the bar 97 and screwed into the back of the door 64. The lower end of the bar 97 terminates in a fork 102, too narrow to embrace the body of the rod 80 and yet wide enough to embrace it in the annular groove 103 formed therein, which groove is in the vertical plane of the fork 102 when the lamp 83 is drawn out, out of danger, so that the door 64 can only be unlocked in that safe position of the lamp.

The current for illuminating the lamps 76, 79 and 83, is brought into the pedestal from the bottom and passes through the fuse box 104, the wires (not shown) extending from there up through the conduit 105 to the junction 106, whence they pass up through the conduit 107 to the bus bar 108, whence they pass through the snap switch 109, with its button 110 on the outside of the panel, and thence they pass to a distributing bus bar (not shown) in the casing 111, whence the wires 112 (some of which are shown in Fig. 5) pass to the sockets of the lamps carried by the panel.

The gas pipe 113 (a small portion of which is seen in Fig. 3) enters the bottom of the pedestal and is carried up close to its inner wall to the top of the valve casing 114, to which it is connected by the connecting nut 115 and the customary nipple. The valve (not shown) in the casing 114 may be of any desired construction to regulate the flow of the gas to the Bunsen burner 62, and is controlled by the valve handle 116 whose stem extends through the wall of the pedestal into the casing 114. A pipe 117, the lower end only of which, is seen in Figs. 8 to 10, is connected at its upper end to the valve casing 114, and said lower end is connected by the union 118 to the short pipe 119 passed through the aperture 120 in the wall of the pedestal 20 and screwed into the hinge block 121 secured to the vertical face 122 of the pedestal by the cap bolts 123 and 124 and by the machine screw 125, as clearly shown in Fig. 8. The block 121 has the hinge ear 126 at its upper end and the combined hinge ear and valve casing 127 toward its lower end, these being entered by the plain reduced ends of the cap bolts 128 and 129 screwed through the hinge ears 130 and 131, formed on the inner end of the arm 59 to make a hinge joint for said arm. The short horizontal passage 132 leads from the inner end of the pipe 119 to the large vertical passage 133, in which is seated the tapered end 134 of the L-shaped connection 135 which swings with the arm 59 and is pressed down to keep a gas-tight connection by the helically coiled expanding spring 136 seated in an annular groove 137 in the connection 135 and held in place by its other end fitting in the annular groove 138 formed in the bottom of the cap bolt 128, and preferably enclosed by the sleeve 139 secured to or extending co-axially with the tapered end 134. The horizontal arm of the connection has the rectangular enlargement 140 fitting in the rectangular aperture 141 formed in a transverse web of the arm 59, while the enlarged end 142, circular in cross-section has its internal diameter greater than the rest of the passage through the connection 135 to receive the end of the slightly flexible metal tube 143 wrapped in the helically coiled spring 144, which end makes a gas-tight joint with the passage through the connection 135. A lug 145 formed in the end of the arm 59 is shaped to engage the hinge block 121 and prevent it from swinging too far to the rear. The angle at 146 in the arm 59 is to conform to the offset 37 and to permit it to swing farther to the front than would be possible without the angle. The tube 143 extends along in the hollow of the arm 59 to the vertical cylindrical portion 147 in which the outer end of the arm terminates, where the tube 143 is connected to the interior of the vertical tube 148 having a closed bottom and fitting in the portion 147, it being held from rising therein by the semi-spherical cap 149 screwed on the threaded extension 150 of said tube 148. The portion 147 has the annular seat 151 therein for the vertical flange of the nut 152 screwed on to the threaded portion 153 of the tube 148. Journaled on the reduced upper portion 154 of the tube 148 is the substantially cylindrical vertical end 155 of the table arm 60, which is held from rising by the enlarged base 156, of the Bunsen burner tube 157, the lower end 158 of which tube is threaded into the top of the tube 148, and the base 156 is preferably formed separately from the body of the tube 157 and screwed thereon. A gas nipple 159 is screwed in the top of the reduced portion of the passage through the tube 157, and the air supply for the burner is controlled by the split ring 160 provided with the apertures 161, (see Fig. 16) co-operating with the apertures 162 in the adjacent portion of the tube 157. The upper end of the tube 157, is reduced, as shown, forming an annular offset 163 on which is seated the lower end of a sleeve 164, which has the double function of supporting at its lower end the catch pan 165 and at its upper end the wind shield plate 166, the pan, sleeve and plate being preferably formed integrally from a piece of sheet metal properly blanked and drawn to the desired shape by dies. A replaceable tip 167 may be screwed into the top of the burner tube 157.

Projecting from the sides of the cylindrical portion 155 of the table arm 60 is a pair of ears 168 in which are placed the rawhide bumpers 169 intended to co-operate with the stop pin 170 screwed into the arm 59 and located so as to prevent the arm 60 from swinging far enough in any position of the arm 59 so that the table 61 could not strike the pedestal or any part of it. The outer end of the arm 60 is preferably provided with a socket 171 (see Fig. 1) in which is journaled a spindle 172 extending downward from the center of the table 61 so that the latter can be turned to bring any side of it adjacent the operator.

An important feature of my invention that is applied to the hot water spray bottle, the saliva ejector, the hot air syringe, and the cold water syringe is illustrated more perfectly in its application to the mouth lamp 31 in Fig. 17. Here a portion of the pedestal 20, the offset 37, the plate 36 and the socket 34 are seen in cross-section so that the inclination of the socket 34 away from the perpendicular and away from the pedestal is clearly shown. The mouth lamp has its two wires in the cable 173 extending downward from the end of the socket piece to the sheave 174 around which it runs, then extending upward to its connections (not shown) to the low voltage fuses 175 connected to the rheostat 29. A very light helically coiled contractile spring 176 is connected at its top to the bottom of the casing in which the sheave 174 is journaled, while its lower end is connected to the eye 177 secured to the cross piece 178 secured to the base 179 of the pedestal 20, so that when the cord 173 is pulled out through the socket 34 in using the mouth lamp 31, it is automatically returned by the spring 176 when it is released, and it will be obvious that this inclination of the socket 34 makes the mouth lamp 31 slant so that it can be easily grasped and holds it so it is not likely to strike the pedestal when it is drawn in and thus break it.

While I have shown and described my invention as embodied in the form which I at present consider best adapted to carry out its purposes, it will be understood that it is capable of modifications and that I do not desire to be limited in the interpretation of the following claims, except as may be necessitated by the state of the prior art.

I claim—

1. In a dental unit, the combination with a hollow pedestal, of a socket extending through a wall thereof and adapted to receive a holder for liquids, an incandescent lamp within the pedestal adjacent the socket, and means extending through the pedestal for controlling the lamp.

2. In a dental unit, the combination with a hollow pedestal, of a socket extending through a wall thereof and adapted to receive a holder for liquids, an incandescent lamp within the pedestal adjacent the socket, a support for the lamp extending through the pedestal movable to vary the position of the lamp relative to the socket, and means extending through the pedestal for controlling the lamp operable in any position of the support.

3. In a dental unit, the combination with a hollow pedestal, of a socket extending through the wall thereof and adapted to receive a holder for liquids, a door in the pedestal, an incandescent lamp within the pedestal adjacent the socket, a support for the lamp extending through the door movable to vary the position of the lamp relative to the socket, a lock for the door, and connections between the lock and the support to prevent the unlocking of the door except in one certain position of the support.

4. In a dental unit, the combination with a hollow pedestal, of a socket extending through the wall thereof and adapted to receive a holder for liquids, a door in the pedestal, an incandescent lamp within the pedestal adjacent the socket, a support for the lamp extending through the door movable to vary the position of the lamp relative to the socket, a lock for the door, and connections between the lock and the support to prevent moving the latter when the door is unlocked.

5. In a dental unit, the combination with a hollow pedestal, of a socket extending through the wall thereof and adapted to receive a holder for liquids, a door in the pedestal, an incandescent lamp within the pedestal adjacent the socket, a support for the lamp extending through the door movable to vary the position of the lamp relative to the socket, a lock for the door, and connections between the lock and the support to prevent the unlocking of the door except in one certain position of the support and to prevent movement of the support when the door is unlocked.

6. In a dental unit, the combination with a hollow pedestal, of a socket extending through the wall thereof and adapted to receive a holder for liquids, a door in the pedestal, an incandescent lamp within the pedestal adjacent the socket, a support for the lamp extending through the door movable to vary the position of the lamp relative to the socket, a lock for the door, and connections between the lock and the support to prevent the unlocking of the door except in one certain position of the support and to prevent movement of the support when the door is unlocked, said connections consisting of a pivoted latch on the door having a tongue adapted to engage the casing in one position, an arm on the latch, a slide connected to said arm and having a fork, and a groove in said support to be entered by the fork when in register therewith.

7. In a dental unit, the combination with a hollow pedestal, of a recess therein having a bottom piece adapted to support a liquid holder, a translucent canopy over the bottom piece in the recess, and an incandescent light in the pedestal back of the canopy.

8. In a dental unit, the combination with a hollow pedestal, of a recess therein having a bottom piece adapted to support a liquid holder, a translucent canopy over the bottom piece in the recess, an incandescent light in the pedestal back of the canopy, a nozzle in the top of the canopy, a water supply for the nozzle, and a valve stem on the outside of the pedestal controlling the water supply to the nozzle.

9. In a dental unit, the combination with a hollow pedestal, of a plate in a wall thereof, a socket set in said plate at an angle diverging away from the adjacent wall of the pedestal, an implement seated in the socket, a flexible element attached to the implement, and means for retracting the element when it is withdrawn and released.

10. In a dental unit, the combination with a pedestal, of an arm pivoted thereto, an arm pivoted to the outer end of the first mentioned arm, a table on the outer end of the second arm, and stops associated with said arms limiting the movement thereof so that the table cannot be swung into engagement with the pedestal.

11. In a dental unit, the combination with a pedestal, of an arm pivoted thereto, an arm pivoted to the outer end of the first mentioned arm, a table on the outer end of the second arm, a pair of abutments carried by the inner end of the second arm, and an intermediate abutment carried by the outer end of the first arm in the horizontal plane through which the pair of abutments swing.

12. In a dental unit, the combination with a pedestal having an angle separating two faces thereof, of an arm pivoted to one of said faces, a second arm pivoted to the outer end of the first-mentioned arm, and a table on the outer end of the second arm, the said first-mentioned arm having an angle therein adapted to register with the angle between the faces when said arm is swung toward the pedestal, for the purpose described.

13. In a dental unit, the combination with a pedestal, of an arm pivoted thereto, a second arm pivoted to the outer end of the first-mentioned arm, a table on the outer end of the second arm whose radius is less than the length of said second arm, and a Bunsen burner having its burner tube concentric with the axis of the joint between the arms and supplied with gas through said joint.

14. In a dental unit, the combination with a pedestal, of an arm pivoted thereto, a second arm pivoted to the outer end of the first-mentioned arm, a table on the outer end of the second arm whose radius is less than the length of said second arm, and a Bunsen burner having its burner tube concentric with the axis of the joint between the arms, the inner journal of said joint being hollow and connected with a gas supply pipe and with said burner tube.

15. In a dental unit, the combination with a hollow pedestal, of a gas supply pipe extending therein, a bracket member on the face of the pedestal in which said gas supply pipe terminates, a pair of horizontal hinge ears extending outward from the bracket member, one of said ears having a valve seat therein connected with the pipe, an arm pivoted on said ears, and a valve member carried by the arm engaging the valve seat.

16. In a dental unit, the combination with a pedestal, of a pair of hinge ears projecting therefrom, one of said ears having a coaxial valve seat therein, an arm pivoted on said ears, and a valve member carried by the arm and cooperating with the valve seat.

17. In a dental unit, the combination with a pedestal, of a pair of hinge ears projecting therefrom, one of said ears having a coaxial valve seat therein, an arm pivoted on said ears, a valve member carried by the arm and cooperating with the valve seat, and means for pressing the valve member into its seat.

18. In a dental unit, the combination with a pedestal, of a pair of hinge ears projecting therefrom, one of said ears having a coaxial valve seat therein, an arm pivoted on said ears, pivot pins extending through the end of the arm into the ears, a valve member carried by the arm and cooperating with the valve seat, and a helically coiled expanding spring interposed between one of said pins and the valve member for pressing the latter against its seat.

19. In a dental unit, the combination with a pedestal, of a pair of hinge ears projecting therefrom, one of said ears having a coaxial valve seat therein, an arm pivoted on said ears, pivot pins extending through the end of the arm into the ears, a valve member carried by the arm and cooperating with the valve seat, and a helically coiled expanding spring interposed between one of said pins and the valve member for pressing the latter against its seat, said last mentioned pivot pin and the valve member having opposed annular grooves in which the ends of the spring are held.

20. In a dental unit, the combination with a pedestal, of a pair of hinge ears projecting therefrom, one of said ears having a coaxial valve seat therein, an arm pivoted in said ears, a valve member carried by the arm and cooperating with the valve seat, a seat for the end of a tube in said valve member, and a tube therein having its end in the seat flexible for the purpose described.

21. In a dental unit, the combination with a hollow pedestal, of a socket member extending through a side wall thereof diverging from the pedestal, an implement adapted to be seated in the socket, a cable in the pedestal attached to the implement which can be withdrawn through the socket, and automatic means for returning the cable when it is released.

22. In a dental unit, the combination with a hollow pedestal, of a panel closing an aperture therein, hinge lugs on the inner surface and one edge of the panel having hooked recesses therein cooperating with the adjacent edge of the aperture, and means for preventing the lateral displacement of the panel.

23. In a dental unit, the combination with a hollow pedestal, of a panel closing an aperture therein, hinge lugs on the inner surface and one edge of the panel having hooked recesses therein cooperating with the adjacent edge of the aperture, and means for preventing the lateral displacement of the panel, said means consisting of spring plates carried by the pedestal and having slots therein cooperating with projections on the hinge lugs.

In witness whereof, I have hereunto set my hand and affixed my seal, this 12th day of July, A. D. 1921.

JOHN V. HANBERG. [L. S.]

Witness:
JOHN HOWARD McELROY.